United States Patent Office 3,148,193
Patented Sept. 8, 1964

3,148,193
CERTAIN 3,3'-BIISOXAZOLINE COMPOUNDS
AND THEIR PRODUCTION
Walter Wilson Gilbert, Hockessin, Del., assignor to E. I.
du Pont de Nemours and Company, Wilmington, Del.,
a corporation of Delaware
No Drawing. Filed May 13, 1960, Ser. No. 28,823
13 Claims. (Cl. 260—307)

This invention relates to methods for preparing isoxazolines and particularly certain new 3,3'-biisoxazolines.

The new substituted isoxazolines of this invention are of the formula:

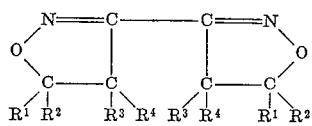

wherein $R^1$ and $R^2$ each represent a member of the group consisting of hydrogen, alkyl of up to 18 carbons, halogen, cyano, carbamyl, formyl, carboxy, alkylcarbonyl of up to 12 carbons, and alkoxycarbonyl, alkoxy, haloalkyl, nitroalkyl, cyanoalkyl, and aminoalkyl in which the alkyl groups contain up to 12 carbons, and $R^3$ and $R^4$ each represent a member of the group consisting of hydrogen, alkyl of up to 18 carbons, phenyl, halogen, cyano, carbamyl, formyl, carboxy, alkylcarbonyl of up to 12 carbons, and alkoxycarbonyl, alkoxy, haloalkyl, nitroalkyl, cyanoalkyl, and aminoalkyl in which the alkyl groups contain up to 12 carbons.

The 3,3'-biisoxazolines of this invention are best made by reacting an olefinic compound with a dihaloglyoxime, under conditions which provide for the presence of at least two moles of the olefinic compound per mole of dihaloglyoxime, in the presence of hydrogen halide acceptor at a temperature of 0° to 50° C.

The dihaloglyoximes correspond to the formula

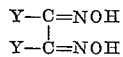

in which Y is halogen of atomic number 17 through 53, i.e., chlorine, bromine, and iodine. Examples are dichloroglyoxime, dibromoglyoxime, and diiodoglyoxime.

The reaction between the olefinic compound and dihaloglyozime can be carried out batchwise, continuously, or semi-continuously. A reaction medium which is inert to the reactants and reaction product may be used if desired but its presence is unnecessary. Suitable reaction media include isooctane, benzene, tetrahydrofuran, benzonitrile, acetophenone, acetonitrile, ethyl acetate, dioxane, cyclohexane, acetic anhydride, etc. When a reaction medium is used, it may be less than, equal to or exceed the weight of the olefin.

In the reaction between the olefinic compound and the dihaloglyoxime, it is critical that a molar excess of the olefinic compound be maintained in the reaction mixture. This is conveniently done in practice by incrementally adding olefinic compound during the reaction period, as required to maintain a molar excess thereof over the molar amount of dihaloglyoxime originally charged to the reactor.

In a convenient method for carrying out the reaction between the olefinic compound and the dihaloglyoxime, a reactor is charged with dihaloglyoxime, reaction medium, and hydrogen halide acceptor. Olefinic compound is then passed through the reaction mixture at ambient pressure and temperatures of from 0° to 50° C., usually 20° to 40° C. The reaction mixture is then allowed to stand with stirring for from 15 minutes to 48 hours. Thereafter the reaction mixture is filtered and the desired product is isolated from the filtrate by distillation, crystallization, or other method known to those skilled in the art.

In another method, the reactor is charged with olefinic compound, reaction medium, and hydrogen halide acceptor. Dihaloglyoxime is then added to the mixture incrementally, while maintaining the temperature at 0° to 50° C., usually 20° to 40° C. After standing with stirring for from 15 minutes to 48 hours, the reaction mixture is filtered and the product is isolated from the filtrate by distillation, crystallization, or other method known to those skilled in the art.

Theoretically the dihaloglyoxime and unsaturated compound react in 1:2 molar proportions. Usually, however, an excess of the unsaturated compound is employed and the excess is removed after reaction is complete. Generally three or more moles of the unsaturate per mole of the dihaloglyozime are used.

The hydrogen halide acceptor is usually present in amount sufficient to react with the acid liberated in the reaction, which is two moles. Therefore, at least two moles of a hydrogen halide acceptor is generally used per mole of dihaloglyoxime. Amines, particularly a tertiary amine such as triethylamine, are preferred acceptors for the hydrogen halide. In place of triethylamine, there can be used other tertiary amines, e.g., trimethylamine, tributylamine, diethylaniline, and the like. Pyridine cannot be used alone in ether solutions since it causes precipitation of a stable pyridinium salt with dichloroglyoxime. Primary and secondary amines can also be used, particularly when the amine also contains the reactive olefinic unsaturation as illustrated by allylamine in Example III.

Although the reaction is usually carried out at ambient pressures, pressures above atmospheric can be used and this has a practical advantage in the case of low boiling olefinic compounds.

Operable olefinic compounds are those which correspond to

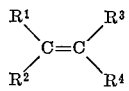

in which the R's have the previously indicated meanings. Examples of such olefinic compounds are ethylene, propylene, 1-butene, 1-decene, styrene, acrylic and methacrylic acids, acrylo- and methacrylonitriles, acrylamide, methacrylamide, vinyl chloride, vinyl acetate, vinylidene chloride, vinyl fluoride, tetrafluoroethylene, tetracyanoethylene, ethyl vinyl ether, methyl methacrylate, diethyl maleate, dibutyl maleate, diethyl fumarate, allyl amine, allyl chloride, allyl cyanide, crotonitrile, methyl vinyl ketone, cyclohexyl vinyl ether, and the like.

The 3,3'-biisoxazolines hydrogenate readily to 3,4 diamino-1,6-hexanediols which find utility as metal chelating agents. They are useful in processes in which metal abstraction is desired, as in the removal of copper from gasoline.

The examples which follow illustrate but do not limit this invention.

EXAMPLE I

To 150 ml. of ether in a stirred 3-necked flask was added 10 ml. (0.072 mole) of triethylamine. Ethylene was bubbled through the solution at room temperature at a rate of 4.3 ml./sec. while 5.0 g. (0.0315 mole) of dichloroglyoxime dissolved in ether was added through a dropping funnel. The addition of the dichloroglyoxime was accomplished in 30 minutes. The suspension of yellow solid in ether was stirred in the presence of ethylene bubbling through the suspension for 1 hour following the last addition. The total volume of ethylene added was 23,200 ml. or approximately 1 mole. The mixture was allowed to stand overnight and the yellowish solid was collected on a filter and washed with ether. This crude solid (10 g.) was added to 80 ml. of water, stirred, filtered and washed with water until essentially free of chloride ion. The residual solid on the filter was dissolved in chloroform and the chloroform solution was concentrated to dryness. The residue, 3,3'-biisoxazoline, was sublimed at reduced pressure, 0.25 g., M.P. 171–173° C. corr. An additional 0.55 g. of this 3,3'-biisoxazoline was recovered from the ether wash of the crude solid above.

*Analysis.*—Calc'd for $C_6H_8N_2O_2$: C, 51.43; H, 5.76; N, 20.01. Found: C, 51.50, 51.63; H, 6.48, 6.29; N, 20.11.

EXAMPLE II

To 20 ml. (0.144 mole) of triethylamine in 100 ml. of acrylonitrile (1.52 moles) in a stirred flask was added dropwise 6.5 g. (0.0413 mole) of dichloroglyoxime in 50 ml. of ether. The mixture was allowed to stand overnight and the triethylamine hydrochloride which formed was removed by filtration. The filtrate was then concentrated to dryness. The residue was taken up in ethyl acetate. Tan crystals separated from the ethyl acetate on cooling. These crystals were sublimed and recrystallized from ethyl acetate. There was obtained 1.3 g. of 4,4'-dicyano-3,3'-biisoxazoline as white crystals, M.P. 188–191° C.

*Analysis.*—Calc'd for $C_8H_6N_4O_2$: C, 50.52; H, 3.18; N, 29.47. Found: C, 50.34; H, 3.47; N, 29.32.

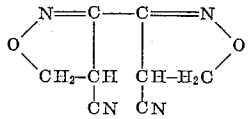

EXAMPLE III

To 50 ml. (0.66 mole) of allylamine in 200 ml. of ether in a stirred flask was added dropwise 5 g. (0.0315 mole) of dichloroglyoxime in 50 ml. of ether. The reaction mixture was filtered and the filtrate concentrated. The residue was heated with ether and extracted with 5% hydrochloric acid. The acid-soluble fraction was washed with ether, filtered, and made basic with 5% aqueous sodium hydroxide solution. The precipitated amine, ca. 1 g., was extracted with ethyl acetate. Tan crystals separated from the solution on cooling. The crystals were recrystallized from ethyl acetate, M.P. 158° C. The product corresponds in structure to: bis(aminomethyl)-3,3'-biisoxazoline.

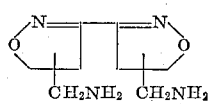

EXAMPLE IV

To 21.2 g. of diethyl maleate (0.123 mole) and 20 cc. of triethylamine (0.144 mole) in 200 ml. of ether in a stirred flask was added dropwise 10 g. of dichloroglyoxime (0.0615 mole) in 50 ml. of ether during 1.5 hours. After stirring for 16 hours, triethylamine hydrochloride and an orange tar were removed by filtration. The filtrate was extracted with 5% hydrochloric acid and 5% aqueous sodium hydroxide solution and concentrated. The resulting neutral liquid was evaporatively distilled to remove diethyl maleate and leave a residue weighing 1.2 g. This solid was pressed on a porous plate and recrystallized from ethanol, M.P. 123–125° C., and further purified by sublimation under reduced pressure. The product was 4,4',5,5'-tetracarboxyethyl-3,3'-biisoxazoline.

*Analysis.*—Calc'd for $C_{15}H_{24}N_2O_{10}$: C, 50.47; H, 5.65; N, 6.54. Found: C, 50.68; H, 5.39; N, 7.27.

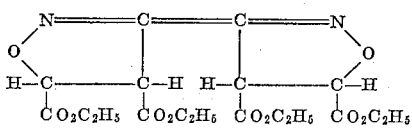

EXAMPLE V

To 50 ml. (0.42 mole) of tetramethylethylene and 20 ml. of triethylamine (0.144 mole) in a stirred flask was added dropwise 5 g. (0.0318 mole) of dichloroglyoxime in 50 ml. of ether during 35 minutes at 25–35° C. After allowing the mixture to stir overnight, triethylamine hydrochloride was collected on a filter, and the filtrate was extracted with 5% hydrochloric acid. The remaining ether solution was concentrated to leave 1 g. of oily solid. This solid octamethyl-3,3'-biisoxazoline, was recrystallized from methanol and sublimed. There was thus obtained a product melting at 192–193° C.

*Analysis.*—Calc'd for $C_{14}H_{24}N_2O_2$: C, 66.63; H, 9.58; N, 11.11. Found: C, 67.78; H, 9.73; N, 9.32.

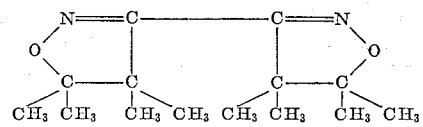

In the tabulation, the products in the right column (or mixture of isomers thereof) are obtained by substituting the oxime shown in the left column and the olefinic compound shown in the middle column for the corresponding oxime and olefinic compound in the process of Example I.

*Table I*

| Oxime | Olefinic Compound | Product |
|---|---|---|
| Dichloroglyoxime. | $H_2C=CH-CH_2NO_2$ | 4,4'-dinitromethyl-3,3'-biisoxazoline |
| Do | $H_2C=CH-CH_2Cl$ | 4,4'-dichloromethyl-3,3'-biisoxazoline |
| Do | $H_2C=CH-COOH$ | 3,3'-biisoxazoline-4,4'-dicarboxylic acid |
| Do | $H_2C=CH-\overset{O}{\overset{\|}{C}}-NH_2$ | 3,3'-biisoxazoline-4,4'-dicarboxamide |
| Do | $H_2C=CH-\overset{O}{\overset{\|}{C}}-CH_3$ | 4,4'-diacetyl-3,3'-biisoxazoline |
| Do | $H_2C=CH_2-CH_2CN$ | 4,4'-dicyanomethyl-3,3'-biisoxazoline |

Table I.—Continued

| Oxime | Olefinic Compound | Product |
|---|---|---|
| Dichloroglyoxime | $H_2C=\overset{H}{\underset{|}{C}}-CHO$ | [structure] 3,3'-biisoxazoline-4,4'-dicarboxaldehyde |
| Dibromoglyoxime | $H_2C=CH(CH_2)_8CH_3$ | [structure] 4,4'-dinonyl-3,3'-biisoxazoline |
| Diiodoglyoxime | $H_2C=CH-C_6H_5$ | [structure] 4,4'-diphenyl-3,3'-biisoxazoline |

It is to be understood that while definite positions for the substituents are indicated in the tabulation, because of the existence of position isomers, the products may be isomeric mixtures rather than the single pure isomer shown.

What is claimed is:

1. A compound of the formula:

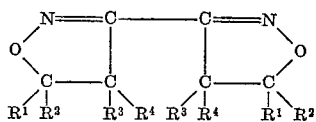

wherein $R^1$ and $R^2$ each represent a member of the group consisting of hydrogen, alkyl of up to 18 carbons, halogen, cyano, carbamyl, formyl, carboxy, alkylcarbonyl of up to 12 carbons, and alkoxy-carbonyl, alkoxy, haloalkyl, nitroalkyl, cyanoalkyl, and aminoalkyl in which the alkyl groups contain up to 12 carbons, and $R^3$ and $R^4$ each represent a member of the group consisting of hydrogen, alkyl of up to 18 carbons, phenyl, halogen, cyano, carbamyl, formyl, carboxy, alkylcarbonyl of up to 12 carbons, and alkoxycarbonyl, alkoxy, haloalkyl, nitroalkyl, cyanoalkyl, and aminalkyl in which the alkyl groups contain up to 12 carbons.

2. 3,3'-biisoxazoline.
3. 4,4'-dicyano-3,3'-biisoxazoline.
4. Bis(aminomethyl)-3,3'-biisoxazoline.
5. Octamethyl-3,3'-biisoxazoline.

6. A method of preparing a compound of the formula:

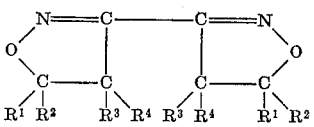

which comprises contacting a dihaloglyoxime of the formula:

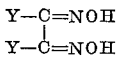

wherein Y is halogen of atomic number 17–53, with an olefinic compound of the formula:

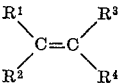

at a temperature of 0° to 50° C. in the presence of a hydrogen halide acceptor, $R^1$ and $R^2$ each representing a member of the group consisting of hydrogen, alkyl of up to 18 carbons, halogen, cyano, carbamyl, formyl, carboxy, alkylcarbonyl of up to 12 carbons, and alkoxycarbonyl, alkoxy, haloalkyl, nitroalkyl, cyanoalkyl, and aminoalkyl in which the alkyl groups contain up to 12 carbons, and $R^3$ and $R^4$ each representing a member of the group consisting of hydrogen, alkyl of up to 18 carbons, phenyl, halogen, cyano, carbamyl, formyl, carboxy, alkylcarbonyl of up to 12 carbons, and alkoxycarbonyl, alkoxy, haloalkyl, nitroalkyl, cyanoalkyl, and aminoalkyl in which the alkyl groups contain up to 12 carbons, the mole ratio of olefinic compound to dihaloglyoxime being maintained at at least 2:1.

7. The method of claim 6 wherein the dihaloglyoxime is dichloroglyoxime.
8. The method of claim 6 wherein the olenfinic reactant is ethylene.
9. The method of claim 6 wherein the olenfinic reactant is acrylonitrile.
10. The method of claim 6 wherein the olefinic compound is allylamine.
11. The method of claim 6 wherein the olefinic compound is diethyl maleate.
12. The method of claim 6 wherein the olefinic compound is tetramethylethylene.
13. 4,4',5,5'-tetracarboxyethyl-3,3'-biisoxazoline.

References Cited in the file of this patent

Quilico: Gazz. Chim. Ital., vol. 82, pp. 140–154 (1952).
D'Alcontres: Gazz. Chim. Ital., vol. 82, pp. 823–7 (1952).
Quilico et al.: Gazz. Chim. Ital., vol. 82, pp. 349–61 (1952).
Dayton: Compt. rend. (Fr. Acad. Sci.), vol. 237, pp. 185–6 (1953).
D'Alcotres et al.: Chem. Abstracts, vol. 47, cols. 8734–5 (1953).
Elderfield: "Heterocyclic Compounds," vol. 5, pages 476–482 (1957).